US010400295B2

(12) United States Patent
Jansen

(10) Patent No.: US 10,400,295 B2
(45) Date of Patent: Sep. 3, 2019

(54) ASBESTOS PROCESSING

(71) Applicant: PMC Holding B.V., Rotterdam (NL)

(72) Inventor: Klaas Jansen, Krimpen aan de Lek (NL)

(73) Assignee: PMC International B.V., AV Dordrecht (NL)

(*) Notice: Subject to any disclaimer, the term of this patent is extended or adjusted under 35 U.S.C. 154(b) by 122 days.

(21) Appl. No.: 15/104,289

(22) PCT Filed: Dec. 23, 2014

(86) PCT No.: PCT/NL2014/050900
§ 371 (c)(1),
(2) Date: Jun. 14, 2016

(87) PCT Pub. No.: WO2015/099529
PCT Pub. Date: Jul. 2, 2015

(65) Prior Publication Data
US 2016/0376673 A1  Dec. 29, 2016

(30) Foreign Application Priority Data
Dec. 23, 2013 (WO) ............... PCT/NL2013/050950

(51) Int. Cl.
| C21C 7/00 | (2006.01) |
| C21C 5/56 | (2006.01) |
| B09B 3/00 | (2006.01) |
| C21C 7/10 | (2006.01) |
| F27B 3/08 | (2006.01) |
| F23G 5/10 | (2006.01) |
| F23G 7/06 | (2006.01) |
| F27B 3/20 | (2006.01) |
| B29L 31/36 | (2006.01) |

(52) U.S. Cl.
CPC .......... *C21C 7/0087* (2013.01); *B09B 3/0066* (2013.01); *B09B 3/0083* (2013.01); *C21C 5/562* (2013.01); *C21C 7/10* (2013.01); *F23G 5/10* (2013.01); *F23G 7/065* (2013.01); *F27B 3/085* (2013.01); B29L 2031/36 (2013.01); C21C 2100/02 (2013.01); C21C 2200/00 (2013.01); F23G 2202/20 (2013.01); F23G 2900/7005 (2013.01); F23J 2217/103 (2013.01); F23J 2900/15002 (2013.01); F27B 3/20 (2013.01)

(58) Field of Classification Search
CPC ..... C21C 7/0087; C21C 7/10; C21C 2100/02; C21C 2200/00; C21C 5/562; B09B 3/006; B09B 3/0083; A62D 3/32
See application file for complete search history.

(56) References Cited

U.S. PATENT DOCUMENTS

| 5,370,066 A | 12/1994 | Workman et al. |
| 5,662,050 A | 9/1997 | Angelo et al. |
| 2007/0251607 A1* | 11/2007 | Roulot ................. B09B 3/0025 148/507 |

FOREIGN PATENT DOCUMENTS

| AT | 411818 | | 6/2004 |
| DE | 4301977 C1 | * | 1/1994 |
| DE | 4407339 | | 9/1995 |
| EP | 1277527 | | 1/2003 |
| GB | 0817414 | | 7/1959 |
| GB | 2445420 | | 7/2008 |
| JP | 2004204260 | * | 7/2004 |
| JP | 2004204261 | | 7/2004 |
| JP | 2007307548 | | 11/2007 |
| JP | 2008249220 | | 10/2008 |
| JP | 2011036321 | | 2/2011 |
| WO | 199733840 | | 9/1997 |
| WO | 199803830 | | 1/1998 |

OTHER PUBLICATIONS

JP 2004204260 Machine translation of the description (Year: 2004).*
Gomez, E et al. "Thermal plasma technology for the treatment of wastes: A critical review" Journal of Hazardous Materials. 161. pp. 614-626. doi:10.1016/j.jhazmat.2008.04.017 (Year: 2009).*
Heberlein, J. "Thermal Plasma Waste Treatment" Journal of Physics D: Applied Physics. 41. pp. 1-20. doi:10.1088/0022-2737/41/5/053001 (Year: 2008).*
Poiroux, R et al. "High temperature treatment of waste: From laboratories to the industrial stage." Pure & Applied Chemistry. 68:5. pp. 1035-1040. (Year: 1996).*
Tam, V. et al. "A review on the viable technology for construction waste recycling." Resources Conservation & Recycling. 47. pp. 209-221. doi:10.1016/j.resconrec.2005.12.002 (Year: 2006).*

(Continued)

Primary Examiner — Tima M. McGuthry-Banks
(74) Attorney, Agent, or Firm — OspreyIP, pllc; James R. Cartiglia

(57) ABSTRACT

The invention is directed to a method for processing asbestos-containing steel scrap into useful products, which products can be handled in a safe manner. In accordance with the present invention the asbestos-containing steel scrap is melted in a furnace, which results in destruction of the asbestos fibers. It has been found possible to carry out such a process in an economically feasible manner. In accordance with the invention asbestos-containing steel is heated to high temperature so that the steel melts. As a result the asbestos will be converted into harmless material, which allows for safe handling and processing of the resulting products.

8 Claims, No Drawings

(56) References Cited

OTHER PUBLICATIONS

Yellishetty, M. et al. "Environmental life-cycle comparisons of steel production and recycling: sustainability issues, problems and prospects." Environmental Science and Policy. 14. pp. 650-663. doi:10.1016/j.envsci.2011.04.008 (Year: 2011).*
JP 2004204260 A. Human translation (Year: 2004).*
JP 2011036321 machine translation of the description. (Year: 2011).*
DE 4301977 C1 machine translation of the description. (Year: 1994).*
Cox, A., "Friable v. Non-Friable Asbestos," www.hwma.net, Mar. 11, 2011, pp. 1-4, XP055234670 [retrieved on Dec. 8, 2015].

\* cited by examiner

ASBESTOS PROCESSING

BACKGROUND OF THE INVENTION

The invention is in the field of recycling. More particularly the invention is in the field of processing steel scrap that has been contaminated with asbestos.

Asbestos is known as a material used in construction to provide mechanical strength and fire resistance. Because of its low thermal conduction capabilities and therefore its heat and fire resistance, it has been incorporated in a wide variety of constructions in various forms, amongst others in the sectors of building construction and mechanical engineering.

In the recent decades it has become clear that asbestos causes health problems such as asbestos lung disease (asbestosis), lung cancer and malignant mesothelioma. Therefore the use of asbestos has been banned in almost all countries. To date a vast amount of obsolete constructions still contain asbestos. When such constructions are to be disposed for destruction or recycling it is very important that the asbestos contained therein is disposed of in a safe manner.

Because of the safety hazards, asbestos disposal should be carried out with utmost precautions. The current disposal of asbestos containing materials comprises disposing thereof in special regulated dumping sites. This disposal methodology requires large disposal volumes, especially if the asbestos is present in other objects, such as pipes covered with asbestos or pieces of metal to which asbestos is attached, e.g. by an adhesive.

An alternative is to dissolve the asbestos, for instance in an alkaline solution. This prevents airborne contamination/inhalation of asbestos fibers. However, it is very difficult to operate a process involving dissolving asbestos to separate it from asbestos containing material in an economically feasible way.

EP-A-1 277 527 discloses a method to dispose of asbestos, which involves placing the initial product as pieces in a tunnel oven at a temperature of between 600° C. and 1000° C. for drying the asbestos fibres. This is followed by mechanical comminuting to produce a secondary raw material without asbestos for the cement industry. The disadvantage of this method is that it requires a considerable amount of energy. Also the method it not suitable for processing steel material that contains asbestos.

JP-A-2004/204261 describes a recycling method for scrap of building materials generated on a dismantling field in which iron resources can be recovered. According to this known method contaminated scrap is classified in fractions including resin content scrap and asbestos content scrap. The asbestos containing scrap is charged in small quantities in a processing furnace, which is filled with molten iron obtained from an essentially non-contaminated fraction. The classification of the different fractions requires handling, which may result in asbestos being emitted into the environment. Moreover, according to this known method only small quantities of 2 tons or less of asbestos contaminated steel can be processed by mixing it in an existing steel melt.

US-A-2007/0251607 describes a process for handling fragments that are contaminated with asbestos, which requires a step of coating the fragments to immobilize the asbestos particles. Coating the fragments is an extra step, requiring extra handling, which increases the risk of asbestos particles being emitted into the atmosphere.

WO-A-98/03830 describes an approach for melting a railway car contaminated with asbestos, which involves the entire railway car being put into a melting unit. No measures are described to avoid spreading of asbestos into the environment.

WO-A-97/33840 describes processing asbestos containing waste in a vitrification method. The materials are bagged in plastic bags, which are subsequently milled. Apart from the step of bagging, no measures appear to be described to avoid spreading of asbestos into the environment, in particular not in the milling step.

DE-A-44 07 339 describes processing asbestos containing waste from buildings and building materials. The waste material is sealed inside a container, in particular a steel container. No other measures are taken to avoid spreading of asbestos particles into the environment.

GB-A-0 817 414 relates to the field of casting of titanium and other reactive metals. Vacuum is used for the removal of air (oxygen) from the room that surrounds the furnace.

AT-A-411818 describes the disposal of asbestos waste packed in pressure vessels by melting the pressure vessels in a furnace. The inside of vessels is sealed from the outside and as such no asbestos can escape before the waste is loaded into the furnace.

U.S. Pat. No. 5,662,050 describes a rotary kiln to treat toxic or hazardous waste and to produce "glass-like" or "ceramic-like" end products and useful metal products.

GB-A-2445420 relates to the treatment of hazardous waste components such as asbestos.

JP-A-2008/249220 describes melting and detoxifying asbestos-containing waste metal but does not describe the cooling of the molten metal or the recovery of said metal.

U.S. Pat. No. 5,370,066 describes an apparatus in which hazardous waste material is molten. The molten waste is solidified into inorganic ceramic-like aggregate material.

JP-A-2007/307548 is directed to a method for melting asbestos waste.

There still is a need for efficient and cost-effective methods that allow for processing of large quantities of asbestos-containing steel scrap without having to rely on the presence of other non-contaminated steel feeds and that is inherently safe in that the asbestos particles cannot spread into the environment. Such a method should not emit toxic compounds into the environment that are normally associated with asbestos and the processing thereof, such as polychlorinated biphenyls (PCBs), petroleum based products, paints, coatings, and the like.

BRIEF SUMMARY OF THE INVENTION

It is an object of the invention to provide a method to process asbestos-containing steel scrap into useful products, which products can be handled in a safe manner. Another object is that the method of the invention should not result in emission of any toxic components into the environment. Yet another object of the invention is to provide a method to process PCB or petroleum based coating contaminated metal into useful products, without emission of toxic components into the environment. In accordance with the present invention the asbestos-containing steel scrap is melted in a furnace, which results in destruction of the asbestos fibers. It has been found possible to carry out such a process in an economically feasible manner. In accordance with the invention asbestos-containing steel is heated to high temperature so that the steel melts. This is preferably done by submerging the asbestos-containing steel into an existing melt. The step wherein the asbestos containing scrap is fed to the melt is carried out sealed from the environment in a substantially gas-tight manner. As a result the asbestos will be converted into harmless material without asbestos fibers being emitted to the environment, which allows for safe handling and processing of the resulting products.

DETAILED DESCRIPTION OF THE INVENTION

The invention is directed to a process for recycling asbestos-containing steel scrap, which scrap comprises a combination of steel and asbestos, which process comprises the steps of:
- a) subjecting said asbestos-containing steel scrap to a temperature above the solidus temperature of said steel by submerging said steel scrap into a melt, which comprises molten steel; and
- b) allowing said steel scrap to melt and to mix into said molten steel, while allowing a slag to form, wherein said asbestos is converted into non-crystalline material, which dissolves in said steel and/or accumulates in said slag;
- c) allowing said molten steel to cool, thus forming a homogeneous steel scrap product that is free, or substantially free of asbestos; and
- d) analyzing the homogeneous steel scrap product to produce a certificate of analysis so it may be used in steel mills for altering the composition of steel melts;

wherein said steps a) and b) are carried out in a room that is sealed off from the environment in a substantially gas-tight manner, so as to substantially prevent emission of fibers.

Thus the invention provides a method for recycling asbestos-containing steel scrap into purified metal blocks, without emitting asbestos fibers to the environment and at a low cost. The steel scrap may also be contaminated with toxic components like PCBs or petroleum based coatings. Emission of toxic elements resulting from the toxic components is also preferably avoided. The scale of the operation can be industrial scale, typically with a capacity of more than 200 kiloton per year, preferably more than 300 kiloton, typically up to 750 kiloton per year.

By submerging the asbestos-containing steel scrap in the liquid steel bath completely, emission of fibers into the environment is substantially prevented. By "substantially free" is meant that the steel scrap product contains no asbestos fibers in any amount that would be considered harmful or dangerous. In particular any fibers still present in said product should be immobilized therein, so that no harmful amounts of fibers can become airborne, thus substantially preventing emission of asbestos fibers therefrom. When emission of fibers is said to be "substantially prevented", it is meant that at all times the fiber concentration in the surrounding atmosphere remains below safety standards, in particular below 1000 fibers per $m^3$, more preferably below 500 fibers per $m^3$. Such conditions are considered to result in a safe working environment by most international standards. More preferably the concentration of fibers is as low as about 20-40 fibers per $m^3$, which is the generally accepted to be the background level of asbestos fibers.

The steps of feeding the contaminated scrap to a melt and allowing the contaminated steel to melt are sealed off from the environment. This is done by carrying out these steps in a room that is sealed off from the environment in a substantially gas-tight manner.

In the context of the present invention, the substantially gas-tight manner relates to measures to avoid outflow of air contaminated with asbestos particles. This may for instance be effected by maintaining the pressure inside of said room below 1 atm. Typically the pressure is about 0.05-0.1 bar below atmospheric pressure. By maintaining the pressure of said room below atmospheric pressure, an air flow from outside to inside the room will limit air being able to flow from inside to outside the room.

This principle can be tested in a laboratory. In such a test a small piece of scrap, typically about 500 g, which is contaminated with an asbestos layer of known composition and weight, is fed into a small furnace with a molten steel bath, which furnace is then sealed of in a gastight manner. The off-gas of the furnace is carefully measured and controlled. After cooling down a HEPA filter is able to catch any asbestos fiber in the off-gas that was not melted in the liquid steel bath. Finally the HEPA filter can be checked on asbestos fibers with an electron microscope (TEM or SEM), and the off-gas chemical composition can be checked.

Any air or other gas that is vented into the environment is in addition passed through a high efficiency particulate air (HEPA) filter. Such a known filter is able to remove small particles with a very high efficiency.

In a preferred embodiment, the process furthermore comprises an off-gas burning system. The off-gas burning system is a known technique that is used to capture particles from a gas stream. In a normal off-gas burner the off-gas is heated to a high temperature, e.g. from 700-900° C., typically approximately 800° C.

In accordance with the present invention the temperature of the off-gas in the off-gas burning step is chosen much higher, for instance above 1200° C., e.g. 1250-1350° C., which will destroy any resulting asbestos particles.

After heating up the gases to a high temperature, for instance 1200° C., the gases should be cooled. Cooling is done rapidly to avoid formation of dioxins and furans. To this end cooling is done preferably to a temperature lower then 500° C., more preferably below 200° C. Within the temperature range 200-600° C. dioxins and furans are formed, the most critical range for the formation of these compounds being 200-400° C. Most preferably the cooling rate in the range 200-400° C. is at least 100° C./s.

Preferably cooling is done in two steps. The first cooling step, typically down to 400° C. can be done relatively slow. The second step, from 400° C. to 200° C., is preferably done rapidly, typically within 2 seconds, to prevent forming of dioxins and furans again (de novo synthesis).

After cooling the off-gas to a temperature lower then 200° C., further treatment may take place by separation of the remaining dioxin and furan components from the off-gas stream through techniques such as the injection of activated adsorbents, filtering in a bag house filter system and combinations thereof.

In another preferred embodiment, the casting area is located in a different room than the furnace area where melting takes place. In this way the casting can be done at a different pressure than the melting. Preferably the casting is done at atmospheric pressure, while the melting is done at subatmospheric pressure, as explained above. The casting area can be located at a lower level so that the molten steel can flow to it by its own weight, which is the easiest way to transport molten steel.

In accordance with the present invention it is important to avoid emission of asbestos fibers as much as possible. This means that except for the site where the contaminated steel is taken from, handling and treatment of the material must be carried out while keeping it hermetically separated from the environment. This is obtained by transferring the pieces of the asbestos-containing steel that are obtained by cutting the contaminated objects into small pieces locally, immediately into gas-tight containers. Typically such containers may hold approximately 4-8 tons of contaminated steel.

The gas-tight, in particular airtight, containers are transported to the facility that holds the melting steps of the present invention, and enters said facility while maintaining an underpressure to avoid any asbestos particles flowing out.

Once inside the melting room, the containers can be opened and their contents can be transferred into the molten liquid steel bath. Typically, the containers are emptied in a bunker, for instance via a conveyor belt. Another conveyor belt can be used to transport the contaminated scrap to the furnace that holds the molten steel bath. At all times a lower pressure vis-à-vis the outside pressure (viz. an underpressure with respect to the outside environment) is maintained. The contaminated scrap on the conveyer belt can be preheated. Preheating can be done on the conveyer belt, which transports the scrap into the furnace. Alternatively the scrap can be preheated with a so called "shaft principle", where the scrap is preheated in a separate compartment on top of the furnace. Also other pre-heating techniques can be used.

The optionally preheated scrap is subsequently fed smoothly to the liquid steel bath, without emitting asbestos fibers to the environment. The technique concerning a preheated conveyer belt is proven and readily commercially available. Next the container is closed, brought outside the melting room, where it may be cleaned, so that it is ready to hold the next batch of contaminated steel.

Scrap can be classified in various ways. The highest level of specification is to distinguish the source of the scrap directly from steel processing (new scrap), and scrap from products after their use (old scrap).

New scrap is generated during the initial manufacturing processes and in average does not need any pre-treatment besides cutting.

Old scrap is collected after a use cycle, either separately or mixed, and is often contaminated to a certain degree, depending highly on its origin and the collection systems used. This invention is focused on this category of scrap, wherein the scrap is contaminated with asbestos.

Old scrap according to the European Union can be classified according to the products in which the metal was used before it became waste. The main iron and steel scrap sources throughout the world are:

Vehicles and transportation
Construction and building
Large equipment and machinery
Electronics and electrical equipment
Packaging material Asbestos-contaminated steel scrap is commonly used in all categories but mainly in the first two. The present invention is for instance suitable for processing asbestos-contaminated scrap from railroad carriages, which traditionally contain considerable amount of asbestos adhered to the steel body, in particular in the form of sound deadening panels. The steel scrap is usually separated whenever possible along the dismantling process and is sold for direct re-use or to traders or treatment plants. Scrap that is contaminated with asbestos normally ends up in official dumping places where it is stored, isolated from the environment, typically in double plastic packaging material. Because this is expensive the contaminated scrap is often illegally shipped through export, which poses serious environmental concerns. A notorious example is the beaching of asbestos contaminated ships on shores of developing countries.

In accordance with the invention asbestos-containing steel is heated so that the steel melts. As a result the asbestos will degrade, in particular the asbestos crystals will be converted into amorphous materials, such as silicates and optionally other salts.

The heating and melting of the asbestos-containing scrap is preferably done using an electric arc furnace heating process. First scrap steel is loaded into air-tight containers at the storage location without exposing the environment to its content. The containers are designed in such way that they will open above the conveyer belt, which conveyer belt transports and releases the scrap into the bunker. From the bunker, another conveyer belt is fed with contaminated scrap, which conveyer belt transports the scrap from the bunker smoothly into the furnace. The logistic process is described hereinbelow. The furnace may for instance be a basic oxygen furnace, an open-hearth furnace or an electric arc furnace. It is important that the furnace allows for constant flat bath operation. Preferably an electric arc furnace is used.

The invention allows for different processing, depending on the degree of contamination of the steel scrap. All types of asbestos-contaminated steel scrap must be considered dangerous to the environment and human health as a result of air emissions from one or more source categories. The contaminated steel scrap is therefore treated in such way that the risk exposure to the environment or humans is excluded.

The invention may be used for treatment of steel that is contaminated with non-friable asbestos, as well as with friable asbestos.

At the start-up of the process the furnace is charged with steel scrap, which is molten to produce a furnace filled with a melt. The melt typically has a temperature of about 1500-1700° C. Higher temperatures are not preferred because this may cause damage to the refractory material.

Once these temperatures are reached, a special container with contaminated steel scrap is introduced on the conveyer belt, which transports and smoothly slides the contaminated scrap into the furnace and melted until the desired weight of melted steel is reached. When the steel is completely melted, further possible treatment may take place, for instance to check and optionally adjust the chemical composition. Impurities in the melt may be removed in conventional manners if necessary or required. In this stage also other compounds, such as aluminum (Al), silicon (Si), chalk and the like may be added.

When the desired composition is met the steel melt may be poured into a ladle. This process is called tapping. After the first heat is tapped a small amount of steel liquid is left behind into the furnace. The ladle transports the liquid steel to a casting area with separate molds or to a continuous casting area. In these areas the liquid steel is poured into molds or transferred to a casting system to obtain the desired shape of the metal blocks. This process is called casting.

After solidification in the molds the formed steel scrap blocks are removed therefrom, this process is referred to as stripping. After stripping a purified metal block of steel scrap is obtained, and it is possible to have a detailed specifications of its content. These blocks may then be stored or directly transported e.g. to steel mills to be further processed. Typically these blocks are purchased by steel mills or scrap yards. Because these blocks may have a known composition, and this composition can be made available together with a batch of blocks of the same composition, these blocks can be blended with steel melts to alter the composition thereof in a predetermined manner.

The small amount of liquid steel left behind in the furnace is to make sure that a second load of contaminated steel scrap when deposited in the furnace will be completely submerged into the liquid steel bath. It is essential because in this way the scrap and the asbestos is directly confronted with a temperature of liquid metal of at least 1500° C. and it will take fractions of seconds to degrade the asbestos and make it harmless.

It has been found that asbestos will not escape from the bath because the asbestos fibers are chemically degraded in the liquid metal bath. Thus air emission of the fibers is prevented or limited.

The asbestos-containing steel scrap starting material of the present invention is typically steel, e.g. in the form of plates or pipes, which is combined with asbestos, typically by means of an adhesive, such as a polyurethane or acrylate based adhesive. As a result, the separation of the asbestos and the steel is very cumbersome, which problem is circumvented by the present invention.

Asbestos is made up of relative long and thin crystalline silicate mineral fibers. Apart from silicate, the crystals further contain hydroxyl ($OH^-$), and further magnesium (Mg) and/or iron (Fe) and possibly sodium (Na) and/or calcium (Ca). Six minerals are defined as "asbestos", which can be divided into the serpentine class or those belonging to the amphibole class. The serpentine class comprises: chrysotile, $Mg_3(Si_2O_5)(OH)_4$. The amphibole class comprises: amosite, $Fe_7Si_8O_{22}(OH)_2$; crocidolite, $Na_2Fe^{2+}{}_3Fe^{3+}{}_2Si_8O_{22}(OH)_2$; tremolite asbestos, $Ca_2Mg_5Si_8O_{22}(OH)_2$; actinolite asbestos, $Ca_2(Mg, Fe)_5(Si_8O_{22})(OH)_2$, and anthophyllite asbestos $(Mg, Fe)_7Si_8O_{22}(OH)_2$.

In addition, there are other natural minerals, such as richterite, $Na(CaNa)(Mg, Fe^{2+})_5(Si_8O_{22})(OH)_2$, and winchite, $(CaNa)Mg_4(Al, Fe^{3+})(Si_8O_{22})(OH)_2$, which are generally referred to as "asbestiform" rather than asbestos, but are to be understood to be included in the definition of asbestos herein.

Asbestos generally degrades between 400° C. and 800° C., although some asbestos types require temperatures up to 1040° C. During the degradation process the crystals lose their crystalline integrity and the chemical components are converted into their corresponding salts (mostly oxides), such as $SiO_2$ and MgO, as well as $H_2O$, which will evaporate. The amorphous salts may either stay in the melt and end up in the ingots as inclusions, but the majority will be transferred to the slag phase. In either case the materials will be present as harmless amorphous particles.

It was found that when asbestos-contaminated steel scrap is subjected to temperatures that are applied in the furnace during the melting process of the invention, the asbestos fibers will melt and/or degrade within a few seconds, without any air emission taking place.

During the melting process a slag is formed by diffusion. This slag floats on the surface of the molten steel. Slag usually consists of metal oxides, and acts in particular as a destination for oxidized impurities. These impurities may be metallic or non-metallic impurities. Typically slag comprises as the majority compounds calcium oxide (CaO) and magnesium oxide (MgO). Another major component of electric arc furnace slag is iron oxide from steel combusting with oxygen that is injected to provide extra chemical heat for melting the steel and to stimulate the oxidation of impurities (refining).

Preferably the thus obtained slag is removed and further processed to recover metals contained therein which gives further economic and environmental benefits. The slag is optionally further processed into different types of fractions. The slag may be used in construction, e.g. in the construction of roads. The chemical elements originating from the asbestos were found to have a positive effect on the quality of the slag for the purpose of road building.

An apparatus in accordance with the present invention, which is very suitable for the method described herein, typically comprises the following components.
   an electric arc furnace (EAF) with electric arc electrodes; typically the capacity of the furnace is more than 25 ton, preferably between 40 and 100 tonnes
   a transformer for the electric arc furnace
   a furnace refractory material repair shop
   an off-gas cleaning system, suitable for EAF, comprising a post-combustion chamber that is able to heat up off-gas, typically up to 1200° C., and a cooling apparatus that is able to cool the off-gas very rapidly to a temperature lower than 200° C.
   an air filtration unit with high efficiency particulate air (HEPA) filter
   an air ventilation system, suitable for EAFs, capable of maintaining the air pressure lower than the outside building air pressure; typically the underpressure is between 0.05 and 0.1 below atmospheric pressure;
   a device to transport the scrap containers, typically a crane
   a conveyer belt which receives the contaminated scrap from the containers and transports the contaminated scrap at underpressure smoothly to the liquid steel bath, and which during transport to the furnace could possible preheat the contaminated scrap
   cooling water system
   tapping system
   oxygen and chalk powder feeding installations
   molds for ingots (typically weights of the ingots are 0.5 ton and 1 ton)

The housing for the entire installation is constructed in such way that, in combination with the air ventilation system, a slight under pressure in the building can be maintained at all times. By the construction transport of asbestos fibers from the housing to the environment is prevented.

It was found to be possible to operate the invention in such a manner that air emission during the melting process and subsequent steps are well below any acceptable limits. Thus the invention provides for a safe and economical viable method of degrading asbestos.

The installations are typically placed in a special designed building. Within this building an under pressure can be maintained at all times, in combination with the air ventilation system. The slight under pressure provides a second safety layer to protect the environment from asbestos fibers. In the unlikely situation that asbestos fibers would escape from the liquid steel scrap melt without degrading, the under pressure prevents fibers to be transported to the outside environment. Secondly, any fibers that are taken in by the ventilation system, will be caught by the HEPA filter unit.

The transport of the asbestos contaminated scrap starts at the source. The object that contains contaminated asbestos steel should be inspected, typically through specialized firms, which will determine the level of contamination and apply a suitable code for transport.

The object may contain different types of steel. Steel grades are divided in three classes according to the European Commission's End of Waste Regulation:
   Unalloyed steel grades in which the mass fraction of an alloying element remains below a certain critical value.
   Stainless steel which is a generic term for a group of corrosion-resistant steel containing a minimum of 10.5% chromium. The types of stainless steel can be divided in ferritic, martensitic, austenitic and duplex;

each category containing its own critical specifications. Varying additions of nickel, molybdenum, titanium, niobium and other elements may be present.

Other alloyed steel grades refer to steel grades that fall outside the above mentioned definitions. Alloy quality steels comprise steel grades required to meet certain requirements related to the aspect of the demanding product.

The steel scrap should be collected in such manner that the analysis of the different types of steel scrap are maintained as homogeneous as possible.

The steel asbestos-contaminated scrap is collected in containers, typically small containers (for instance between 4 and 8 tonnes). The small containers will be put on transportation where it will be stored in a separated closed building, while maintaining underpressure. Alternatively, the containers will be emptied in a bunker within the building where they are collected, albeit separated from the melting room, at a lower than atmospheric pressure in order to prevent fibres to be released to the environment.

The invention supports the ultimate sustainability of steel scrap by eliminating the asbestos from the supply chain and preventing the steel scrap being dumped. The invention can also be used to clear existing dumps by processing the contaminated scrap contained therein.

The invention not only provides new raw material possibilities in the shape of steel but elements like nickel, molybdenum, wolfram and other elements can be recycled as well.

The products of the present invention can be used to provide different steel mills with new raw material. The new cleaned steel scrap has upgraded commercial value and may be provided with a certificate of analysis indicating its chemical composition. The value differs from current scrap categories because it is homogeneous and provided with analysis. Typically the products of the invention can be sold as high-quality scrap, i.e. material to be used in steel mills for altering the composition of steel melts. The high quality is derived from the fact that the chemical composition can be known, since the product is homogeneous, as opposed to normal scrap, which is inhomogeneous and therefore has an unknown exact composition.

Thus the invention provides a short chain of transportation which is very easy to control.

The invention claimed is:

1. A process for recycling asbestos-containing steel scrap that is contaminated with friable asbestos, which scrap comprises a combination of steel and asbestos, which process comprises the steps of:
   a) subjecting said asbestos-containing steel scrap to a temperature above the solidus temperature of said steel by completely submerging said steel scrap in a melt, which comprises molten steel;
   b) allowing said steel scrap to melt and to mix into said molten steel, while allowing a slag to form, wherein said asbestos is converted into non-crystalline material, which dissolves in said steel and/or accumulates in said slag;
   c) allowing said molten steel to cool, thus forming a homogeneous steel scrap product that is substantially free of asbestos fibers; and
   d) analyzing the homogeneous steel scrap product to produce a certificate of analysis so that said product may be used in steel mills for altering the composition of further steel melts; wherein said steps a) and b) are carried out in a room that is sealed off from an environment in a substantially gas-tight manner that is obtained by maintaining said room under a pressure that is subatmospheric, so as to prevent emission of fibers into said environment.

2. The process according to claim 1, comprising a step wherein said slag is removed and is used as a source of magnesium, silica or both.

3. The process according to claim 2, followed by a step of using said asbestos-free homogeneous steel scrap product in a steel melt to alter said steel melt to a predetermined chemical composition.

4. The process according to claim 1, wherein the asbestos-containing steel scrap is part of a vehicle, a construction, equipment or machinery.

5. The process according to claim 1, wherein a clean air stream is fed to said room through one or more air inlets, whereby an air stream is obtained that may contain asbestos particles, wherein said air stream that may contain asbestos particles is subjected to a particle removal step, so that asbestos particles are removed therefrom, thus producing a clean air stream, followed by venting said clean air stream into the environment through at least one air outlet.

6. The process according to claim 5, wherein said particle removal step comprises a high efficiency particulate air (HEPA) filter, an off-gas burning step, or both in series.

7. The process according to claim 6, comprising an off-gas burning step, in which said air stream that may contain asbestos particles is heated to a temperature of 1200-1350° C., followed by cooling to a temperature of 350-450° C.

8. The process according to claim 7, comprising an off-gas burning step, in which said air stream that may contain asbestos particles is heated to a temperature of 1200-1350° C., followed by cooling to a temperature of 350-450° C.

* * * * *